United States Patent [19]

Linares et al.

[11] Patent Number: 5,092,429
[45] Date of Patent: Mar. 3, 1992

[54] SYSTEM FOR REPLACING ENGINE LUBRICANT

[76] Inventors: Raul F. Linares; Kenneth I. Scarboro, both of P.O. Box 68, Suwanee, Ga. 30174

[21] Appl. No.: 493,625

[22] Filed: Mar. 15, 1990

[51] Int. Cl.⁵ .............................................. F16N 33/00
[52] U.S. Cl. ...................................... 184/1.5; 184/6.4; 184/6.24; 123/196 S
[58] Field of Search ................. 184/1.5, 6.1, 6.4, 108, 184/6.24; 123/196 R, 196 S, 196 A; 73/64

[56] References Cited

U.S. PATENT DOCUMENTS

| | | | |
|---|---|---|---|
| 1,074,730 | 10/1913 | Morris | 184/6.24 |
| 1,702,703 | 2/1929 | Osborne | 184/1.5 |
| 1,829,173 | 10/1931 | Wertz | 184/1.5 |
| 1,841,505 | 1/1932 | Sweetland | 184/1.5 |
| 1,886,098 | 11/1932 | Hedglon | 184/1.5 |
| 1,962,623 | 6/1934 | Sweetland | 184/1.5 |
| 2,102,795 | 12/1937 | Gray | 184/1.5 |
| 2,320,048 | 5/1943 | Parson | 184/1.5 |
| 2,411,539 | 11/1946 | Gunn | 184/6.24 |
| 2,509,426 | 5/1950 | Fransen | 137/353 |
| 2,644,430 | 7/1953 | Lang | 184/1.5 |
| 2,657,705 | 11/1953 | Gerhard et al. | 137/351 |
| 2,661,869 | 12/1953 | Simpson | 141/26 |
| 2,946,328 | 7/1960 | Mettetal, Jr. | 123/196 R |
| 3,216,527 | 11/1965 | Lewis | 184/1.5 |
| 3,447,636 | 6/1969 | Bonfilio | 184/1.5 |
| 3,720,287 | 3/1973 | Martel | 184/1.5 |
| 3,743,053 | 7/1973 | Kuklewicz | 184/1.5 |
| 3,867,999 | 2/1975 | Cox | 184/1.5 |
| 3,939,397 | 2/1976 | Maisonville | 324/392 |
| 3,954,250 | 5/1976 | Grace | 251/144 |
| 4,095,673 | 6/1978 | Takeuchi | 184/1.5 |
| 4,512,299 | 4/1985 | Egan et al. | 123/196 A |
| 4,613,014 | 9/1986 | Millet | 184/1.5 |
| 4,674,456 | 6/1987 | Merritt | 184/1.5 |
| 4,694,793 | 9/1987 | Kawakita et al. | 184/108 |
| 4,742,476 | 5/1988 | Schwartz | 123/196 S |
| 4,869,346 | 9/1989 | Nelson | 184/1.5 |

Primary Examiner—Ira S. Lazarus
Assistant Examiner—Alan B. Cariaso
Attorney, Agent, or Firm—Hill, Van Santen, Steadman & Simpson

[57] ABSTRACT

A system for replacing spent lubricant in an internal combustion engine including a subsystem for calculating engine wear based on actual engine activity, preferably shaft revolutions. An adaptation of the system includes a subsystem for selecting lubricant filters.

22 Claims, 5 Drawing Sheets

SYSTEM FOR REPLACING ENGINE LUBRICANT

BACKGROUND OF THE INVENTION

The present invention generally relates to systems for replacing/changing lubricants in internal combustion engines. More specifically, the invention relates to systems for automatically or semiautomatically effecting such lubricant replacement/change.

It is well-known that the life of an engine can be greatly affected by the frequency with which the lubricants or oils thereof are replaced/changed. Engine life generally is increased with more frequent oil changes. Spent oil generally contains grit and other abrasive particles that cause undue engine wear and the removal of the spent oil reduces engine wear by removal of these abrasive particles.

Systems for replacing/changing the oil in an internal combustion engine are known. Typically, oil replacement systems include a new oil reservoir and a spent oil container coupled to the oil pan of an engine via appropriate valves and pumps. Generally, spent oil is expelled or pumped from the oil pan and then the oil pan is filled with new oil.

Several systems are claimed to perform this oil replacement/change automatically. One such system is a system disclosed in U.S. Pat. No. 3,447,636. The disclosed system includes a unit that is removably mountable in a motor vehicle that effects replacement of oil in the engine. The system connects to the electric supply system of the motor vehicle and, upon actuation of a switch, is stated to effect the replacement of the oil. An indicator lamp is employed to indicate oil replacement system operation.

Engine oil changes for a motor vehicle generally are determined by the mileage the vehicle has traveled since the last oil change. Oil changes for other engines can be determined by the amount of time the engines have been in operation since the last oil changes.

Both of these methods for determining when to change engine oil fail to fully account for actual engine wear. With respect to motor vehicles, engine wear can continue even though a motor vehicle is at rest. For example, an automobile engine idles and thus, continues to wear while the automobile is stopped such as at a stop light or moving slowly such as in a traffic jam. With respect to static engines, i.e., engines mounted at fixed locations, engine wear similarly varies depending on the loads placed thereon and the speeds at which they are run.

SUMMARY OF THE INVENTION

The present invention provides a system for replacing/changing engine lubricant and for determining when to replace the lubricant based on actual engine activity.

To these ends, the invention provides an engine oil replacement/change system including a subsystem for effecting replacement of spent oil with new oil and for storing the spent oil and a subsystem for measuring engine activity and for determining when to replace the engine oil based upon such engine measured activity.

In an embodiment, the subsystem for measuring senses and counts engine output shaft revolutions.

In a preferred embodiment, engine output shaft revolutions are sensed via a pulse detecting coil coupled to a spark plug wire.

In another embodiment, the invention includes a new oil reservoir, a spent oil reservoir, and an engine oil pan coupled to a pump via a valve and piping system so that spent engine oil can be expelled to the spent oil reservoir and then the oil pan can be filled with new oil from the new oil reservoir. A spark detector is employed to determine engine revolutions and a processor counts the revolutions and provides a signal indicating when the engine oil should be replaced.

In a further embodiment, the system includes a subsystem for effecting selection of one of a plurality of the oil pan filters. A supply of selectable filters are coupled in parallel so that upon actuation of a switch, the filter in use in the oil pan is deselected and one of the other filters is selected.

An advantage of the invention is an improved system for replacing the oil in an internal combustion engine.

Another advantage of the invention is a system that can be employed in a motor vehicle so that engine oil can be changed upon simple actuation of a switch from within the passenger compartment.

Yet another advantage of the invention is the provision of a system for determining when to change the oil in an engine based on actual engine activity.

These and other advantages and embodiments will become more apparent with reference to the following detailed description of the preferred embodiments and accompanying drawings.

DETAILED DESCRIPTION OF THE PRESENTLY PREFERRED EMBODIMENTS

Figure 1:
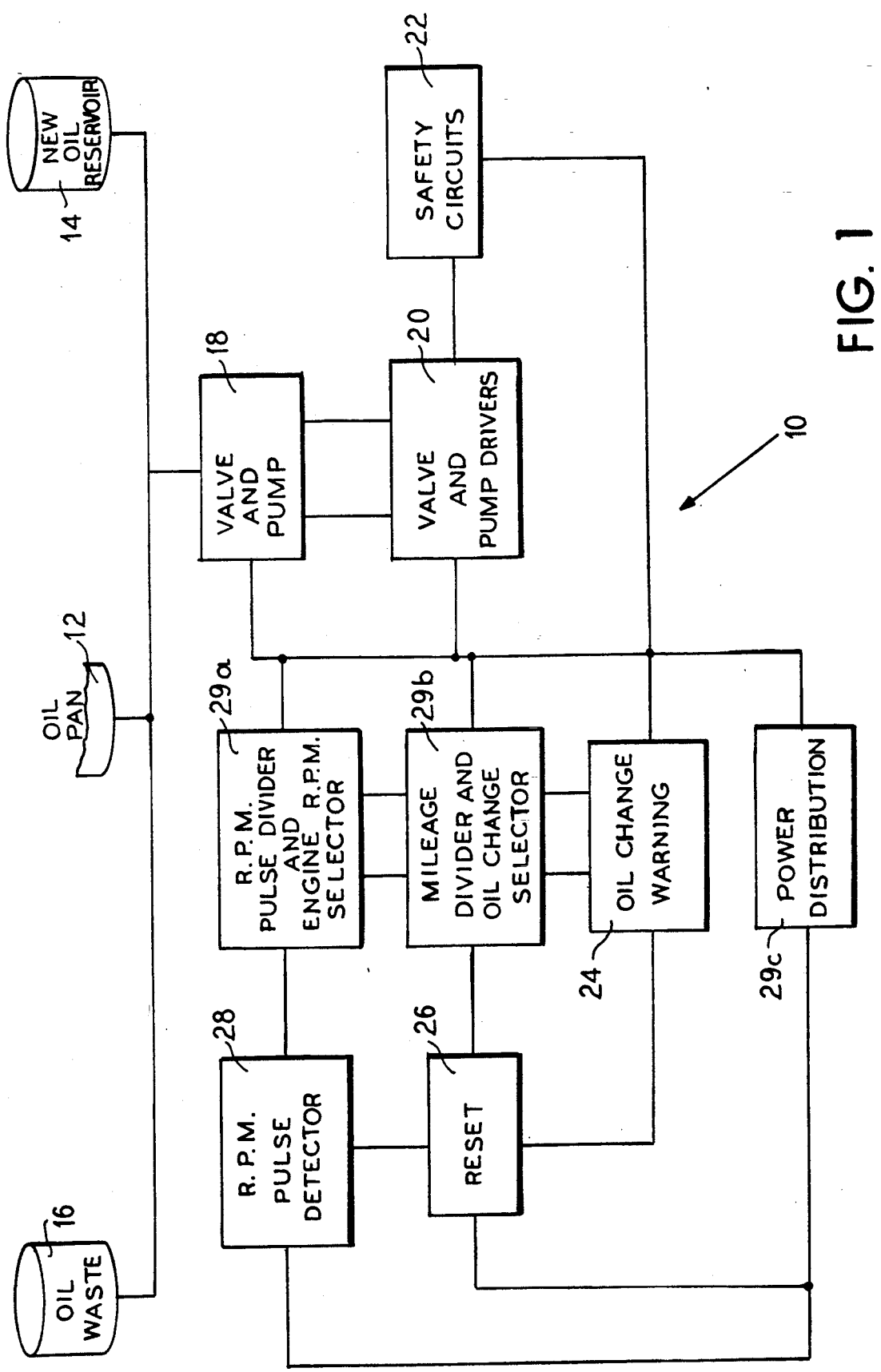
FIG. 1 illustrates in block schematic form, a first embodiment of a system embodying principles of the invention.

A system 10 embodying the principles of the invention is illustrated generally in FIG. 1. The system 10 is designed to be employed in connection with an internal combustion engine of a motor vehicle such as an automobile. However, it can be appreciated that the principles of the invention apply to non-motor vehicle engines as well.

As illustrated, the system 10 is designed to interconnect an oil/lubricant pan 12, a new oil/lubricant reservoir 14, and a spent oil/lubricant reservoir 16 so that oil in the oil pan can be changed/replaced, as desired. To effect flow of oil to and from the oil pan 12, a pump station 18 is provided.

As will be described more fully below, the pump station 18 includes a pump and several valves to effect transfer of oil among the reservoirs. Accordingly, connected thereto are valve and pump drivers 20 to effect operation of the station pump and valves.

To ensure safe and normal operation of the system 10, safety circuitry 22 is coupled to the pump and valve drivers 20 so as to detect abnormal operation thereof. Hence, the safety circuitry 22 is coupled to warning circuitry 24 so as to generate appropriate warning signals to an operator.

The warning circuitry 24, in turn, is appropriately coupled to reset circuitry 26, so that the warning circuitry 24 can be reset/realarmed to enable once again the generation of warning signals.

A pulse detector circuit 28 is provided, as will be more fully explained below, to detect electrical current pulses supplied to spark plugs of the engine. The detection of the provision of a spark plug pulse is used to count shaft revolutions and this count, in turn, is used to indicate engine activity.

To effect counting of such pulses, coupled to the pulse detector circuit 28 are count divider (encoder) circuits 29a and 29b which serve to detect when a shaft revolution count reaches a preselected number. Additionally, the count divider circuit 29b serves to allow selection of the count at which the system will warn an operator to effect a change of oil in the engine.

Coupled to all of the circuits, the pump station and the drivers is a power distribution circuit 29c. This circuit provides appropriate power to the circuits and drivers, as needed.

Figure 2:
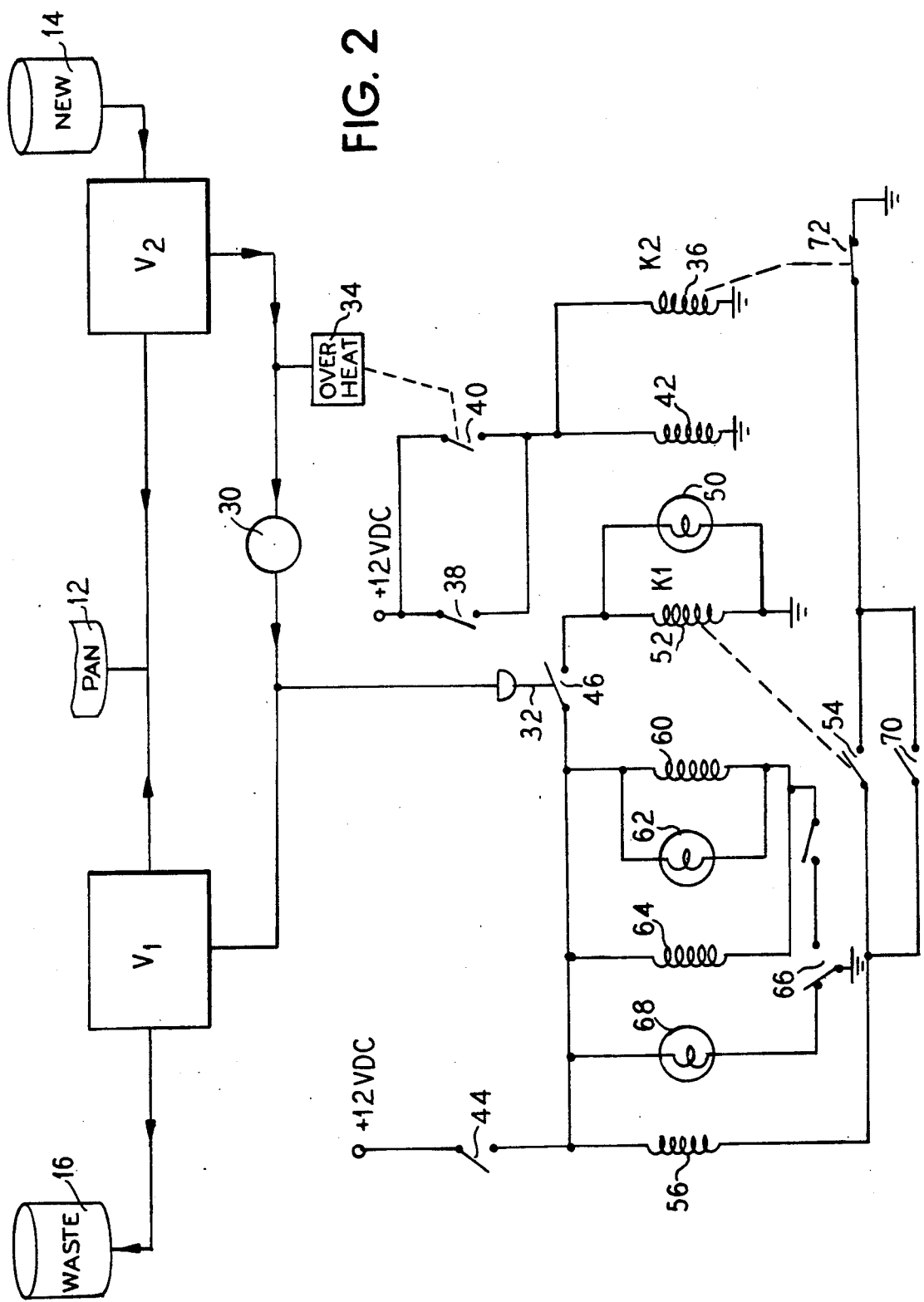
FIG. 2 illustrates a flow diagram for a valve and piping subsystem employed in the system of FIG. 1 and a circuit diagram for associated safety circuitry and drivers.

In FIG. 2, the interconnections of the reservoirs 12, 14, and 16, and pump station 18, as well as all associated drivers and relays are illustrated in greater detail.

In FIG. 2 it can be seen that the oil pan 12 is coupled between two solenoid valves V1 and V2. The valve V1 is arranged to have two outlets while the valve V2 is arranged to have two inlets. Actuation of the valves V1 and V2 effects selection of one of the outlets or inlets, respectively.

The oil pan 12 is coupled in fluid communication to one of the inlets of the valve V2 and to one of the outlets of the valve V1. The new oil reservoir 14 is coupled to the other inlet of the valve V2 while the spent oil reservoir 16 is coupled to the other outlet of the valve V1.

Additionally, the valves V1 and V2 are coupled to each other via a pump 30. An inlet of the pump 30 is coupled to the outlet of the valve V2 while the outlet of the pump 30 is coupled to the inlet of the valve V1.

Because the valves V1 and V2 are solenoid actuated, they have energized and non-energized states. In its non-energized state, the valve V1 allows fluid to flow through its inlet and out through the outlet coupled to the spent oil reservoir 16. The valve V2 allows fluid to flow through its inlet coupled to the oil pan 12 and out through its outlet coupled to the pump 30. However, it can be appreciated that unless the pump 30 is caused to operate, oil will not drain from the oil pan 12 to the spent oil reservoir 16.

When oil is to be transferred to the oil pan 12 from the new oil reservoir 14, valve V1 is energized and caused to switch so that oil does not flow to the spent oil reservoir 16, but instead flows to the oil pan 12. Similarly, valve V2 is caused to switch so that oil flows from the new oil reservoir 14 to the pump 30, but oil does not flow from the oil pan 12 to the pump 30.

Coupled to the outlet of the pump 30 is a pressure sensor 32. The pressure sensor 32 senses pressure exerted by oil in the outlet conduit. The lack of sufficient pressure indicates an empty conduit, i.e., no oil in the conduit. Conversely, the sensing of sufficient pressure indicates the presence of oil in the conduit.

In the conduit coupled to the inlet of the pump 30, there is connected an overheat sensor 34. The overheat sensor 34 is provided to detect excessive oil temperature and to prevent operation of the system when the oil temperature is too high.

In FIG. 2, there are also illustrated the safety circuitry 22 and warning circuitry 24 that are interconnected with the pressure sensor 32 and overheat sensor 34. As can be seen, the safety and warning circuitry are coupled to the 12 volt power supply of the motor vehicle via a plurality of switches.

The coil 36 of a safety relay K2 is coupled to the power supply via parallel switches, a starter switch 38, and overheat sensor switch 40. The starter switch 38 preferably is the key switch of the motor vehicle, and is normally open unless the engine ignition is energized. The overheat sensor switch 40 is actuated by the overheat sensor 34. The switch 40 is normally open unless an overheat condition is sensed. The coil 36 of safety relay K2 is coupled parallel to the ignition coil 42 of the engine. Accordingly, the energization of the ignition coil 42 via turning of the ignition creates a condition that will cause energization of the safety relay K2.

The safety relay K2 serves to prevent operation of the system by effecting the opening of a normally closed switch 36a so as to remove any current flow through the pump 30. Accordingly, oil will not be permitted to flow through the pump 30 and oil will not drain from the oil pan 12.

The warning circuit 24 is coupled to the power supply via a main power switch 44. The switch 44 is manually actuated by the operator of the system 10 to effect operation of the system.

Coupled to the main power switch 44 is a normally open pressure switch 46 actuated by the pressure sensor 32. It can be appreciated that the switch 46 is normally open unless there is sufficient oil pressure in the conduit at the outlet of the pump 30.

Coupled in series with the pressure switch 46, and parallel to each other, are an automatic mode lamp 50 and a coil 52 of an automatic mode relay K1. The lamp 50 serves to generate a warning light indicating that the pump 30 is in automatic mode. The relay K1 serves to place the pump 30 in automatic mode by causing the closure of automatic mode switch 54. It can be appreciated that sensing of pressure at the outlet of pump 30 will cause the relay K1 to remain energized thereby to maintain the closure of switch 54.

Since switch 54, which is coupled in series with the winding 56 of the pump 30, serves to maintain the application of power to the pump 30 as long as sufficient oil pressure is sensed at the outlet of the pump 30.

Also coupled to the main power switch 44 are the coil 60 of the solenoid valve V2 and a fill cycle lamp 62. The lamp 62 generates a warning light to indicate that the system is in a "fill cycle," i.e., that new oil is being transferred from the new oil reservoir 14 to the oil pan 12.

Similarly, the coil 64 of the solenoid valve V1 is also coupled to the main power switch 44. Both coil 60 and coil 64 are coupled in series with mode select switch 66 so that selection of one position of the switch 66 causes both valves V1 and V2 to switch to their actuated state, wherein oil is transferred to the oil pan 12 from the new oil reservoir 14, as described above.

In its other position, the switch 66 is coupled in series with an empty cycle lamp 68 which illuminates to indicate that the system 10 is an "empty cycle," i.e., that oil is being transferred from the oil pan 12 to the spent oil reservoir 16, as described above.

Coupled in parallel to the switch 54 is a start switch 70 that serves to commence operation of the system 10. Switch 70 is manually actuated by the operator of the system.

It can be appreciated that absent sufficient pressure in the outlet conduit of the pump 30, the pump 30 will not be placed in "automatic mode" because the switch 54 will remain open. Accordingly, the pump 30 must be operated manually via pressing the start switch 70. However, sufficient oil pressure due to pumping of the oil will cause the closure of switch 54 and the start switch 70 will be bypassed and the pump 30 will continue to operate, hands free, hence the term "automatic mode."

Of course, any attempt to start the engine via actuation of the switch 38 or sensing of an overheat condition will cause safety relay K2 to be energized and to effect a shutdown of the system, as described above.

The normal sequence of events which take place during operation of the system described above are set forth below. Variations are identified where appropriate.

It can be appreciated that when spent oil is to be replaced/changed, the spent oil must be sufficiently warm so as to flow freely. To this end, a cold engine is started by appropriate actuation of the motor vehicle starter switch 38. The engine is allowed to run for a few minutes to warm the oil contained therein. Once the oil is sufficiently warmed, the ignition is turned off, while leaving power applied to the electrical system of the motor vehicle switch 44, FIG. 2.

At that time, the main power switch 44 of the system of the invention is turned on to activate the system 10. The empty cycle lamp 68 turns on, to advise the operator that the system 10 has been placed in the empty oil mode, i.e , a mode wherein spent oil is removed from the engine oil pan 12.

With the system in the empty oil mode, the start switch 70 is pressed and the pump 30 is energized to commence pumping of the oil from the oil pan 12 to the spent oil reservoir 16 as discussed above. The pressure sensor 32 located at the outlet of the pump 30 senses the pressure of the oil in the line and closes the switch 46 which energizes coil 52 of automatic mode relay K1. Relay K1 effects closure of the switch 54 across the start switch 70 so as to bypass same. Accordingly, the pump 30 is held in an on state until the pressure sensor 32 fails to detect sufficient oil pressure in the outlet line.

When the pump 30 terminates its operation, the empty cycle lamp 68 turns off advising the operator that the "empty cycle" mode has ended. The operator then must operate the mode selector switch 66 by manipulating same to commence a fill cycle. To this end, the switch 66 is switched to its "fill cycle" position.

Once the mode selector switch 66 has been placed in its fill cycle position, the operator again presses the start switch 70 to commence operation of the pump 30 to pump new oil from the new oil reservoir 14 to the oil pan 12 as discussed above. The solenoid valves V1 and V2 are activated at this time to their fill cycle positions as described above.

After all of the new oil is pumped in, pressure sensor 32 senses the loss of pressure and the associated switch 46 opens removing the 12 volt power supply from the coil of the latching automatic mode relay K1. The opening of the pressure switch 46 also causes the automatic mode lamp 50 to turn off indicating that the fill cycle has been completed. At the same time, the switch 54 returns to its normally open state thereby removing the ground path from pump winding 56, so as to turn the pump 30 off.

It is estimated that the total time required for completing the empty and fill cycles is approximately four minutes.

It is quite possible that one might attempt to perform an oil change when the new oil reservoir 14 is empty. Accordingly, the system 10 is designed to avoid damage to the engine and pump 30 when this situation is present. To this end, since the pressure sensor 32 can only be activated by a pressure at the outlet of the pump 30, a lack of pressure, due to the lack of an oil flow, prevents the pump 30 from ever running in an automatic mode. Thus, the failure of the pump 30 to enter into an automatic mode, should alert an operator of a failure to engage the pump 30 in an automatic mode due to the lack of oil in the line and hence, the lack of oil in the new oil reservoir 14.

Another safety feature provided by the system 10 is the prevention of allowing the system 10 to perform an oil change when the engine associated therewith is in operation. To this end, if the engine is operating, the 12 volt power supply is placed across the ignition coil 42. At that time, the circuit for the ignition coil 42 is completed through the ignition start switch 38. Since the coil 36 of safety relay K is coupled parallel to the ignition coil 42, relay K2 will energize causing its normally closed switch 72 to open and remove all grounding of the pump 30 and coils of the solenoids of valves V1 and V2, thereby preventing same from operating.

Yet another safety feature provided by the invention is the protection of the pump 30 and valves V1 and V2 from being operated while the engine is very hot. Doing so could permanently damage same.

To this end, the system 10 includes the overheat sensor 34 which is physically connected into the oil line at the inlet to the pump 30. Upon sensing a temperature that falls above a preselected temperature, the normally open switch 40 will close, thereby coupling the 12 volt power supply to the coil 36 of the safety relay K2. At that time, the normally closed switch 72 of the relay K2 will open, thereby removing all ground potential from the valves V1 and V2 and the pump 30.

Figure 3:
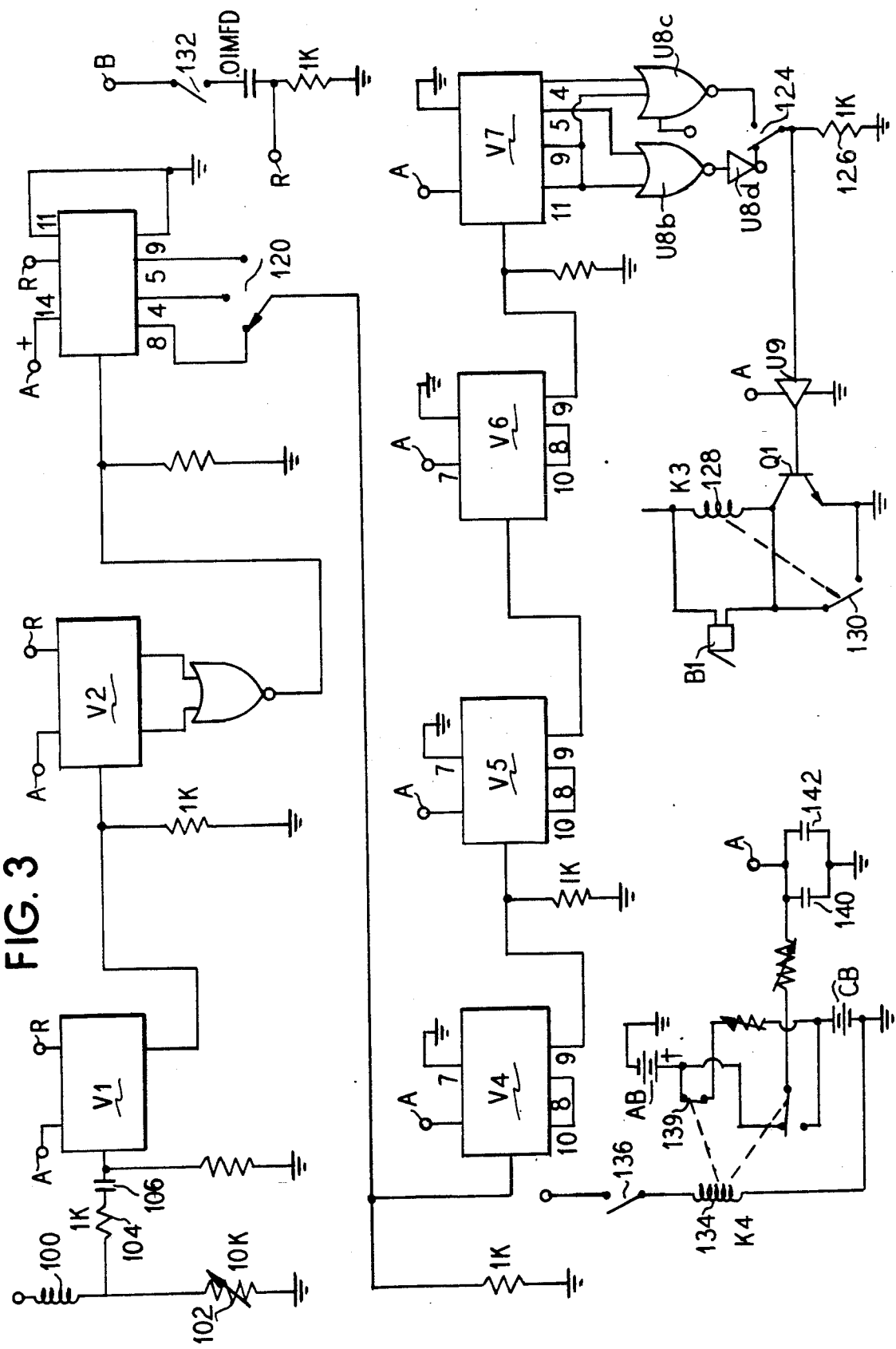
FIG. 3 illustrates a circuit diagram for a circuit used to determine accumulated engine activity in accordance with principles of the invention.

The portion of the electrical subsystem that is directed to determining engine activity is illustrated in FIG. 3. Therein it can be seen that a pick-up coil 100 is provided that is electromagnetically coupled to a distributor cap wire, preferably the distributor cap wire associated with cylinder No. 1. By means of electromagnetic induction, the spark plug wire will transfer pulses of energy to the pick-up coil 100, thereby causing same to develop a small voltage pulses of a certain magnitude. A pulse is generated for every energization of the spark plug associated therewith, or, accordingly, for every revolution of the shaft of the engine. The magnitude of this voltage is regulated by means of a variable resistor 102 positioned in series with the coil 100.

It can be seen that the generated voltage pulses are RC coupled through a second resistor 104 and a capacitor 106 coupled between the pick-up coil 100 and the resistor 102 to an encoder chip U1.

The encoder chip U1 comprises a pulse divider, preferably a decade pulse divider, i.e., the chip U1 will produce an output for every 10 pulses (10 shaft revolutions) generated at its input.

The output of the chip encoder U1 is provided to an input of another encoder chip U2. The encoder chip U2 is a similar decade pulse divider such that for every 10 input pulses it will also produce 1 output pulse. Accordingly, every output of the encoder chip U2 represents 100 revolutions of the engine shaft. Encoder chips U1 and U2 preferably comprise semiconductor chips available under the designation SN54LS57.

The output pulses of the encoder chip U2 are directed to the input of an encoder chip U3 that provides for a variety of divisions by multiples of 1,000 at its various outputs. For example, the output at pin 5 provides division by 2,000, the output at pin 4 provides division by 4,000, and the output at pin 8 provides division by 8,000. It can be appreciated that via appropriate setting of a selector switch 120 coupled thereto, one of these outputs can be selected by the operator.

In a preferred embodiment, a selection of pin 8 is for high engine revolutions per minute, the selection of pin 4 is for normal revolutions per minute and the selection of pin 5 is for low revolutions per minute. Accordingly, by means of the switch 120, the system 10 of the invention can be adapted to motor vehicles whose engines run at various idle speeds. Therefore, upon installation of the system 10 in a motor vehicle, the operator need only select the switch position that best matches the motor vehicle's engine speed.

As further illustrated, the output of the encoder chip U3 is transmitted through the switch 120 to the input of another encoder chip U4 which, in turn, provides its output to another encoder chip U5, which is also connected to an encoder chip U6 which is connected to another encoder chip U7. The chip U7 is configured to provide multiple outputs in a manner similar to the chip U3. The combination of chips U1 through U7 are responsible for converting the pulses picked-up by the pick-up coil 100 and translating them into 3,000, 5,000, etc. mile oil change options selected via appropriate positioning of an oil change selector switch 124 coupled to the outputs of the chip U7.

In the preferred embodiment the chips U3–U7 comprise semiconductor chips available under the designation SN54290. The appropriate wiring of these chips should be evident to those of skill in the art.

It can be appreciated that the number of chips U2 or U3–U7 used will determine the amount of spark plug pulses which can be counted by the system. Accordingly, the number of chips employed will depend on the frequency with which it is desired to have an indication of when to change the oil of the engine.

Once a selection has been made by positioning the switch 124, and the proper number of shaft revolutions have occurred, logic gate chips U8b, c, and d coupled to outputs of chip U7 provide selectable binary low signals which develops across resistor 126. These binary low signals correspond to various shaft revolution counts. The selected count is fed to the input of an inverting chip U9. The signal generated at the output of the chip U9 is provided to the base of a transistor Q1. The provision of a signal at the base of the transistor Q1 causes current to flow therethrough which causes current to flow through a coil 128 of a relay K3 connected in series therewith. The normally open switch 130 of the relay K3 will close thereby energizing a buzzer B1. This buzzer signals the operator that the selected engine activity limit (i.e. number of shaft revolutions) has been reached so that the operator can proceed, at his/her convenience to effect an oil change in the manner described previously.

After an oil change has been performed, the operator can press a reset switch 132 to reset the system 10. The reset switch 132 is coupled to the supply voltage A, as illustrated, and supplies a reset voltage at lead R to the reset input of the chips U1–U7. At that time, the system memory (i.e., the pulse counts in the chips U1–U7) will be erased, returning the system to count of 0 shaft revolutions.

The power distribution circuitry 29c of the case system is also illustrated at FIG. 3. Therein it can be seen that the power distribution circuitry 29c includes a power distribution relay K4 having a coil 134 that is coupled in series with a switch 136 associated with the key switch of the motor vehicle. When the key switch is positioned so that power is applied to the dashboards, the switch 136 will be in its closed position. In this position, the coil 134 is energized and the relay K4 will effect repositioning of a switch 138 and opening of a normally closed switch 139 associated therewith.

Repositioning of the switch 138 couples parallel capacitors 140 and 142 to battery CB of the motor vehicle. Accordingly, a supply voltage will develop at lead A. This supply voltage is applied to all of the chips U1–U9 as illustrated in FIG. 3.

When the engine of the motor vehicle is turned off, switch 136 will be opened and the coil 134 of the relay K4 will be de-energized and the switch 139 will close and a switch 138 will reposition itself as illustrated in FIG. 3 so as to couple together an auxiliary battery AB and a motor vehicle battery CB so as to provide the supply voltage A. This will ensure that the chips U1–U7 will retain the count accummulated therein. Accordingly, the last engine shaft revolution count is stored in chips U1–U7 until the motor vehicle is used again.

Figure 4:
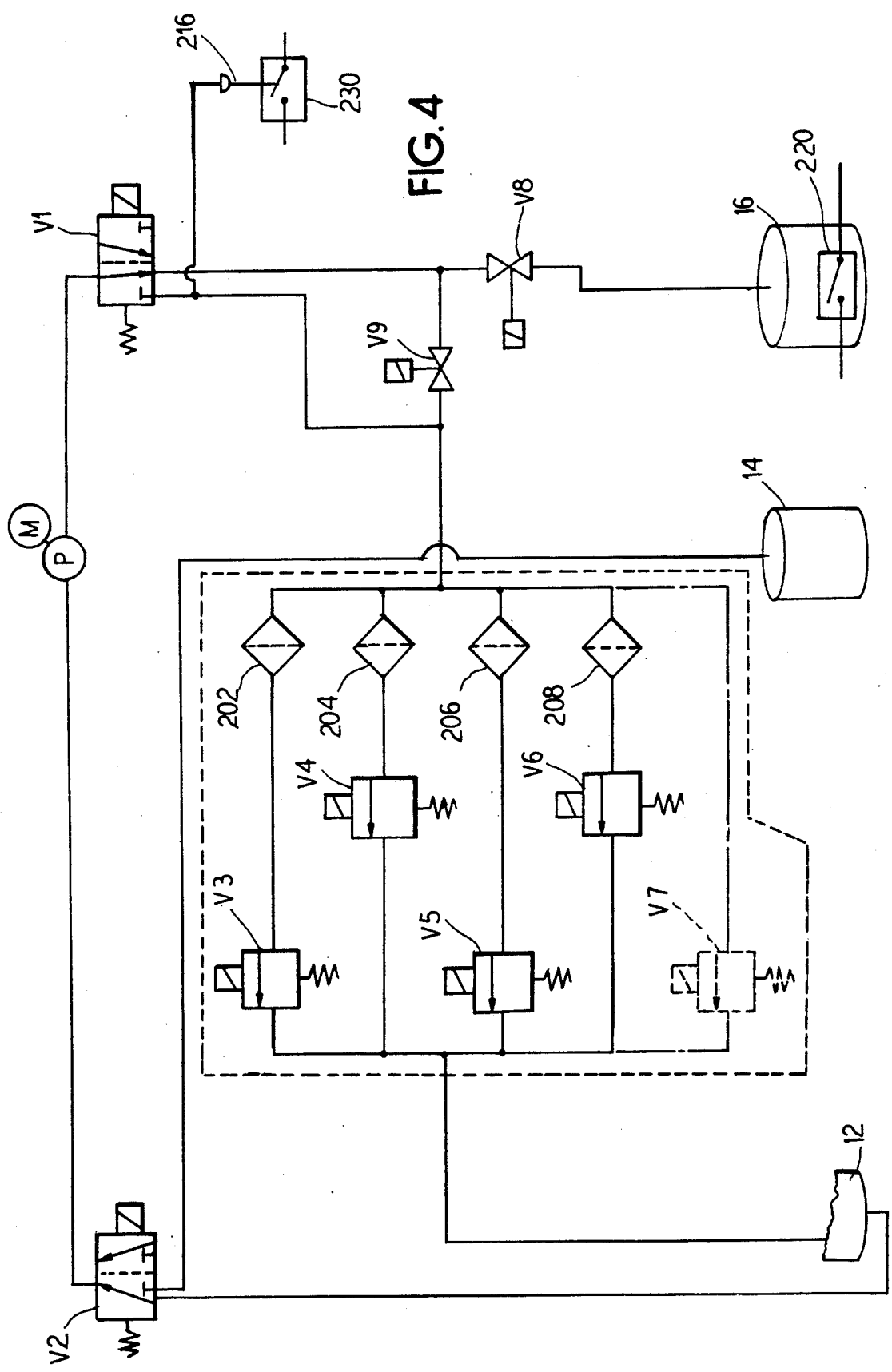
FIG. 4 illustrates another system embodying principles of the invention.
Figure 5:
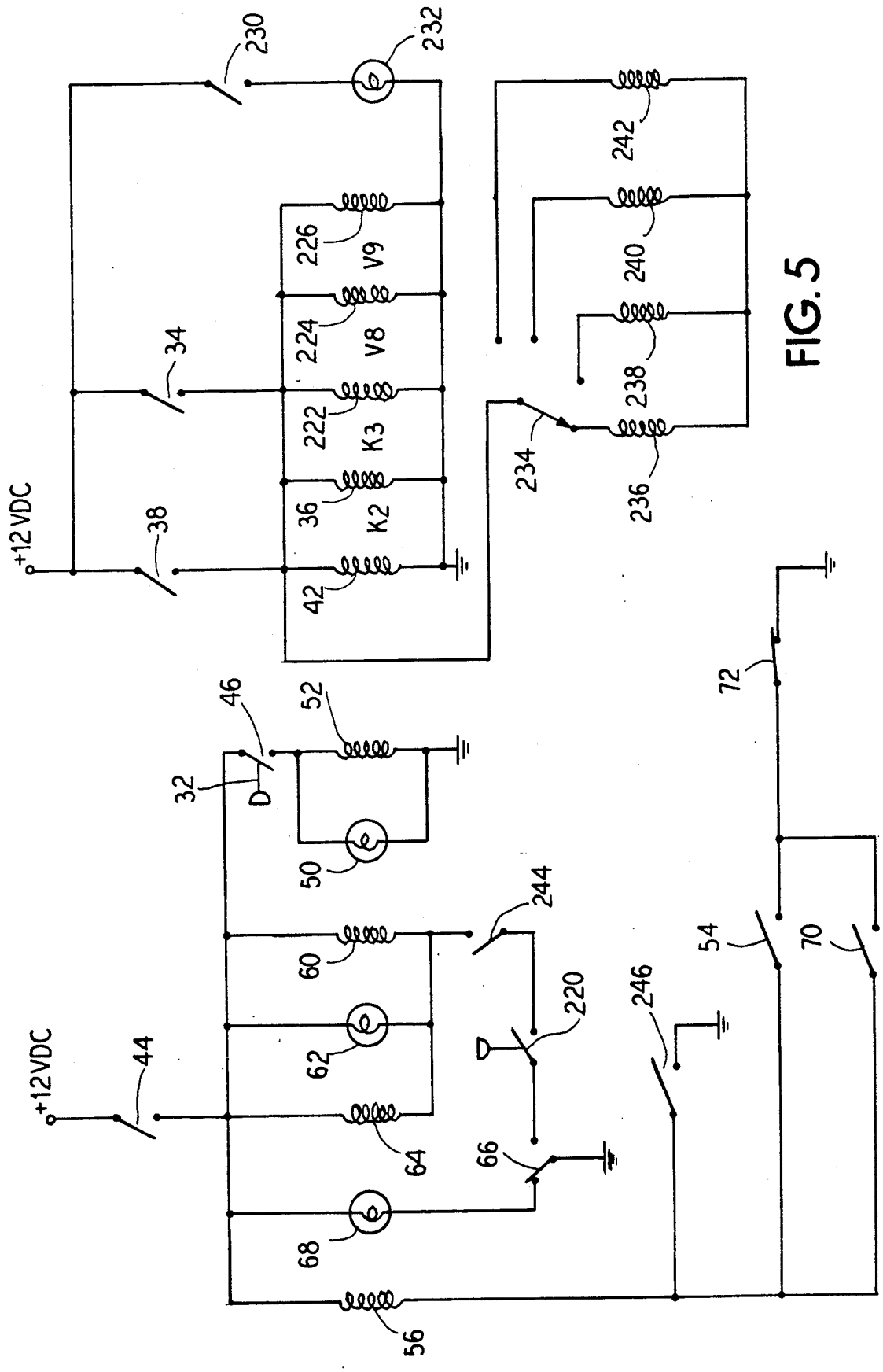
FIG. 5 illustrates a circuit diagram for an electrical subsystem employed in the system of FIG. 4 including safety circuitry as well as drivers.

In FIGS. 4 and 5, another system 200 embodying principles of the invention is illustrated. In the figures, the elements which are identical with those of the system of FIGS. 1–3 are designated by the same reference numerals. The additional elements are designated by new reference numerals.

The system 200 of FIGS. 4 and 5 provides for change of the oil filter used to filter the engine oil during engine operation. Accordingly, by means of the system 200, not only can the oil of the engine by easily changed/replaced, so can the engine oil filter.

To this end, the system 200 of FIGS. 4 and 5 is virtually identical to the system 10 of FIGS. 1–3, but further includes a plurality of parallel connected oil filters 202, 204, 206, and 208 which are connected between the oil pan 12 and the pump 30. Each oil filter has connected in series therewith a solenoid valve V3, V4, V5, and V6, respectively. During normal operation, oil is pumped from the oil pan 12, through the pump 30 and then through one of the oil filters 202, 204, 206, and 208.

A valve V7 is optionally provided as a bypass to the filters 202, 204, 206, and 208. Such a bypass may be desired should all filters be defective or dirty, or when all are being replaced.

The system 200 also includes the following additional components: a valve V8 coupled between the solenoid valve V1 and the spent oil reservoir 16, a valve V9 coupled between the valve V1 and the oil filters 202, 204, 206, and 208; and a pressure sensor 216 coupled to an inlet common to the oil filters 202, 204, 206, and 208.

Further, a level switch 220 is provided in the spent oil reservoir 16 to detect the level of oil contained therein. Should the spent oil reservoir 16 be full, the system will not be permitted to attempt to transfer more oil thereto.

During normal operation of the system 200, the pump 30 is turned on to first pump spent oil from the oil pan 12 to the spent oil reservoir 16. The spent oil is caused to flow from the oil pan 12, through the valve V1, the pump 30, the valve V2, and then through valve V8 to the spent oil reservoir 16. Then the system is placed into a fill cycle.

During a fill cycle, the valves V1 and V2 are energized and new oil is caused to flow from the new oil reservoir 14; through valve V1, the pump 30, the valve V2, and valve V9, one of the filters 202, 204, 206, or 208; and its associated cut-off valve V3, V4, V5, or V6, respectively, to the oil pan 12. This configuration is maintained as long as the motor vehicle remains running.

However, should the selected filter become dirty, an oil pressure will build up at the inlet thereof. This pressure build can be sensed by dirty oil filter pressure sensor 216. A switch actuated by the sensor 216 causes generation of a visually perceptible signal that alerts the operator of the motor vehicle of the need to select a new oil filter. This generally is accomplished when the oil in the oil pan 12 is again changed/replaced.

The spent oil level switch 220 is normally held closed while the reservoir 16 is empty to prevent overfilling of the oil pan 12. Pumping of oil into the oil pan 12 is prevented unless a sufficient amount of oil is present in the spent oil reservoir 16 as will be more fully described in connection with FIG. 5.

In FIG. 5, it can be seen that the safety and warning circuitry of the system 200 has been adapted to accommodate drivers for the valves associated with the oil filters as well as the additional pressure and level sensors. It can be seen that a coil 222 of a relay K5, as well as coils 224 and 226 for solenoids for valves V9 and V8, respectively, have been coupled parallel to the ignition coil 42. Accordingly, starting of the engine will cause energization of the K3 and the valves V7 and V8.

Coupled to 12 VDC power supply is a normally open dirty oil switch 230 and an associated lamp 232. The switch 230 is actuated by the sensor 216. Actuation of the switch 230 will cause same to close to cause the lamp 232 to alert the operator of a dirty oil filter situation.

The circuit is completed via a filter selector switch 234 that has selectable positions, each position corresponding to a coil 236, 238, 240, or 242 of the solenoid associated with the valves V3, V4, V5, or V6, respectively. Accordingly, selective positioning of the switch 234 will ensure the operator to select one of the filters 202, 204, 206, or 208.

Further, it can be seen that a normally closed switch 244 associated with the relay K3 and the normally opened spent oil level switch 220 are serially connected between the mode selector switch 66 and the coils 60 and 64 of the valves V1 and V2. It can be appreciated that the system will be prevented from entering into a fill mode unless a sufficient quantity of oil is present in the spent oil reservoir 16, the engine is not turned on, and the oil is not too hot.

Further, a normally open switch 246 associated with the relay K3 is coupled between ground and the winding 56 of the pump 30. It can be appreciated that the pump 30 will be energized should the engine be turned on or an overheat condition be sensed.

Accordingly, during a normal oil change, the engine is turned off, the mode selector switch 66 is set to its empty cycle position, and the start switch 70 is actuated to its closed position, thereby coupling the windings 56 of the pump 30 to ground to energize same. The main power switch 44 of course has been previously depressed.

The pump 30 will commence extracting oil from the oil pan 12 and transferring same to the spent oil reservoir 16. The pump will be placed in an automatic mode as described previously due to the present pressure in the outlet conduit of the pump 30 which is sent by the pressure sensor 32.

Once the oil has been extracted from the oil pan 12 and the system has completed the empty cycle mode, the mode selector switch 66 is set to the fill cycle position. At that time, spent oil is stored in the spent oil reservoir 16 and the level switch 220 is closed, thus allowing actuation of the valves V1 and V2 and the illumination of the associated fill cycle lamp 62. At that time, the switch 70 is again actuated to energize the pump 30 one more time. The pump will then again enter into its automatic pumping mode as described above.

As soon as the new oil has been transferred to the oil pan 12, the system terminates the pumping action. At that time, the mode selector switch 66 can be returned to its empty cycle position. A new filter is then selected and placed in line with the oil pan 12 by means of the filter selector switch 234. It can be appreciated that every time the engine is turned on by means of the switch 38, the filter selected by means of the selector switch 234 will have the coil of its associated valve energized thereby causing energization of the valve, and, accordingly, selection of that filter.

The normally closed switch 244 which is associated with the relay K3 ensures that the system 200 will not allow the transfer of oil while the selector switch 66 is placed in a fill cycle mode with the engine running. This prevents oil from the new oil reservoir 14 from being pumped and added to oil already present in the oil pan 12. Since the coil 222 of the relay K3 only energizes when the engine is running, the switch 244 will remain open for as long as the engine remains in operation.

It can be appreciated that both systems 10 and 200 provide for automatic or semi-automatic changing/replacement of oil in an engine, particularly an automobile engine, as described above. These systems are preferably designed so that the new oil reservoir 14 and spent oil reservoir 16 are contained within a container that will fit under the hood of a motor vehicle such as an automobile. Thus, as a modular unit, these reservoirs can easily be replaced.

Further, the filters employed in the system 200 are also preferably contained within a modular unit which can be easily replaced. Accordingly, once all the filters in the unit have been used, the entire unit can be replaced so as to provide a plurality of new filters from which to choose. The valves associated with the filters may or may not be included in the modular unit.

While a preferred embodiment has been shown, modifications and changes may become apparent to those skilled in the art which shall fall within the spirit and scope of the invention. It is intended that such modifications and changes be covered by the attached claims.

We claim:

1. A system for replacing lubricant in an engine, comprising:
   a first subsystem for effecting replacement of the lubricant including a replacement lubricant reservoir, a spent lubricant reservoir, and an engine lubricant pan operatively coupled to a system having a pump, valves, and piping so that spent lubricant can be expelled from the engine and stored in the spent lubricant reservoir and the engine lubricant pan can be filled with lubricant from the replacement lubricant reservoir; and
   a second subsystem including a device that measures engine shaft revolutions, a device indicating when the engine shaft has undergone a sufficient number of revolutions to warrant change of the engine lubricant, actuators and switches operatively coupled together and to said first subsystem to appropriately operate said pump and valves, and a device operative to prevent operation of said first subsystem while said engine is running.

2. The system of claim 1, wherein the second subsystem includes a pulse sensor for sensing spark plug pulses to sense engine revolutions, each pulse representing one shaft revolutions.

3. The system of claim 2, wherein said second subsystem includes a plurality of pulse dividers coupled in serial fashion to said pulse sensor to produce a signal indicating that a preselected number of engine shaft revolutions have occurred.

4. The system of claim 1, wherein the second subsystem includes a lamp for indicating the need to effect replacement of the engine lubricant upon measurement of a preselected amount of engine activity.

5. The system of claim 1, wherein said first subsystem includes means for sensing when said lubricant is above a preselected temperature.

6. The system of claim 1, wherein said second subsystem includes a selector switch for selecting a number of engine shaft revolutions at which said system is to indicate to replace said lubricant.

7. A system for replacing spent engine lubricant comprising:
   (a) an engine lubricant reservoir;
   (b) a spent lubricant reservoir;
   (c) a replacement lubricant reservoir;
   (d) a pump operatively coupled to said engine lubricant reservoir, said spend lubricant reservoir, and said replacement lubricant reservoir for fluid communication therewith and for selectively effecting replacement of lubricant in said engine lubricant reservoir with lubricant in said replacement lubricant reservoir, and for transferring lubricant from said engine lubricant reservoir to said spent lubricant reservoir;
   (e) a system for measuring revolutions of the shaft of said engine; and
   (f) a device for preventing operation of said pump while said engine is operating.

8. The system of claim 7, wherein said system for measuring revolutions comprises a coil electronically coupled to a spark plug wire.

9. The system of claim 7, wherein said system for measuring revolutions comprises a coil coupled to a spark plug wire so as to detect spark plug pulses via electromagnetic induction and a plurality of encoder chips serially connected to said coil, said encoder chips serving to produce an output signal when said engine shaft has completed a preselected number of revolutions.

10. The system of claim 7 further comprising a plurality of selectable lubricant filters coupled parallel to each other but in series with an input of said engine lubricant reservoir.

11. The system of claim 7 wherein said system for measuring engine shaft revolutions comprises:
   (a) a coil electromagnetically coupled to a spark plug wire; and
   (b) at least one encoder chip coupled to said coil, said chip producing an output signal upon detection of a preselected number of pulses induced in said coil.

12. The system of claim 11, wherein said encoder chip produces a plurality of output signals, each output signal corresponding to a different count of pulses induced in said coil, and a switch having a selectable contact coupled to said outputs signals thereby enabling selection of one output signal.

13. The system of claim 7 wherein said system for measuring engine shaft revolutions includes means for retaining a cumulative count of shaft revolutions, even when engine power is removed.

14. The system of claim 7, further comprising an audible alarm coupled to said system for measuring engine shaft revolutions so as to indicate passage of a preselected number of shaft revolutions.

15. A system for replacing lubricant in an engine comprising:
   an engine lubricant reservoir;
   a spent lubricant reservoir;
   a replacement lubricant reservoir;
   a pump and valves operatively coupled to said engine lubricant reservoir, said spent lubricant reservoir, and said replacement lubricant reservoir to effect selective transfer of lubricant from said engine lubricant reservoir to said spent lubricant reservoir and from said new lubricant reservoir to said engine lubricant reservoir;
   a plurality of selectable filters coupled parallel to each other and serially to an inlet of said engine lubricant reservoir; and
   filter selecting means for selecting any of said filters.

16. The system of claim 15, including filter selecting means comprising a plurality of valves that are selectively opened and closed coupled serially to said filters, one valve positioned in line with each filter so as to enable selection of one of said filters.

17. The system of claim 15, including a level switch in said spent lubricant reservoir operatively positioned and coupled to actuate whenever said spent lubricant reservoir contains a preselected quantity of lubricant.

18. The system of claim 15, further comprising a fluid pressure switch coupled to a common inlet of said filters.

19. The system of claim 15, wherein said filters are selected by means of a selector switch.

20. A system for replacing spent engine lubricant comprising:
   (a) an engine lubricant reservoir;
   (b) a spent lubricant reservoir;
   (c) a replacement lubricant reservoir;
   (d) a pump operatively coupled to said engine lubricant reservoir, said spent lubricant reservoir, and said replacement lubricant reservoir for fluid communication therewith and for selectively effecting replacement of lubricant in said engine lubricant reservoir with lubricant in said replacement lubricant reservoir, and for transferring lubricant from said engine lubricant reservoir to said spent lubricant reservoir; and (e) a system for measuring revolutions of the shaft of said engine comprising a coil coupled to a spark plug wire so as to detect spark plug pulses by electromagnetic induction and a device coupled thereto for counting spark plug pulses detected by said coil.

21. A system for replacing lubricant in an engine comprising:

an engine lubricant reservoir;

a spent lubricant reservoir;

a replacement reservoir;

a pump and valves operatively coupled to spent lubricant reservoir, and said replacement lubricant reservoir as to effect selective transfer of lubricant from said engine lubricant reservoir to said spent lubricant reservoir and from said new lubricant reservoir to said engine lubricant reservoir;

a plurality of selectable filters coupled parallel to each other and serially to an inlet of said engine lubricant reservoir;

filter selecting means for selecting any of said filters; and a system for measuring revolutions of the shaft of said engine comprising a coil coupled to a spark plug wire to detect spark plug pulses by electromagnetic induction and a device coupled thereto for counting spark plug pulses detected by said coil.

22. A system for replacing lubricant in an engine, comprising:

an engine lubricant reservoir;

a spent lubricant reservoir;

a replacement lubricant reservoir;

a pump and valves operatively coupled to said engine lubricant reservoir, said spent lubricant reservoir, and said replacement lubricant reservoir to effect selective transfer of lubricant from said engine lubricant reservoir to said spent lubricant reservoir and from said new lubricant reservoir to said engine lubricant reservoir;

a plurality of selectable filters coupled in parallel to each other and serially to an inlet of said engine lubricant reservoir; and a device for preventing operation of said pump and valves while said engine is running.

* * * * *

UNITED STATES PATENT OFFICE
CERTIFICATE OF CORRECTION

Patent No. 5,092,429         Dated March 3, 1992

Inventor(s) Raul F. Linares and Kenneth I. Scarboro

It is certified that error appears in the above-identified patent and that said Letters Patent is hereby corrected as shown below:

Column 4, line 26, "switch 36α" should be --switch 36α or 72--

Column 6, line 45, "....switch 72" should be --switch 72 or 36α--

Signed and Sealed this

Ninth Day of May, 1995

Attest:

BRUCE LEHMAN

Attesting Officer        Commissioner of Patents and Trademarks